United States Patent [19]

Long

[11] 4,351,428
[45] Sep. 28, 1982

[54] POWERED WHEEL ASSEMBLY FOR GRAIN AUGERS AND THE LIKE

[76] Inventor: John M. Long, 1078 Main St. N., Moose Jaw, Saskatchewan, Canada

[21] Appl. No.: 141,968

[22] Filed: Apr. 21, 1980

[51] Int. Cl.³ .............................................. B65G 41/00
[52] U.S. Cl. ................................. 198/302; 198/304; 198/316; 198/318
[58] Field of Search ........................ 198/302, 304–306, 198/318–320, 316; 180/19 R, 19 S, 19 H; 280/638, 35, 43.17, 43.23

[56] References Cited

U.S. PATENT DOCUMENTS

| | | | |
|---|---|---|---|
| 767,432 | 8/1904 | Park | 198/304 |
| 3,297,148 | 1/1967 | Andrews | 198/304 |
| 3,391,776 | 7/1968 | Hancock et al. | 198/304 |
| 3,536,364 | 2/1971 | Arndt | 198/304 X |

*Primary Examiner*—Robert B. Reeves
*Assistant Examiner*—Douglas D. Watts
*Attorney, Agent, or Firm*—Stanley G. Ade

[57] ABSTRACT

A wheel assembly extends from both of the auger braces to the ground and is adjustable by means of a jack, in order to lift the lower end of the auger assembly clear of the ground or to raise the wheel assembly when the auger assembly is being towed. A source of power drives the wheel assembly and thus supplies power to the wheel assembly when it is engaged upon the ground so that the auger can be moved by an operator. The wheel assembly is steerable by an off-standing handle thus enabling the auger assembly to be steered into position relative to a grain bin, for example, or relative to a towing vehicle when it is desired to tow the grain auger. The source of power may be hydraulically driven by the auger assembly engine in a hydraulic motor operatively connected to the wheel axle and the jack may be mechanical or hydraulic.

8 Claims, 7 Drawing Figures

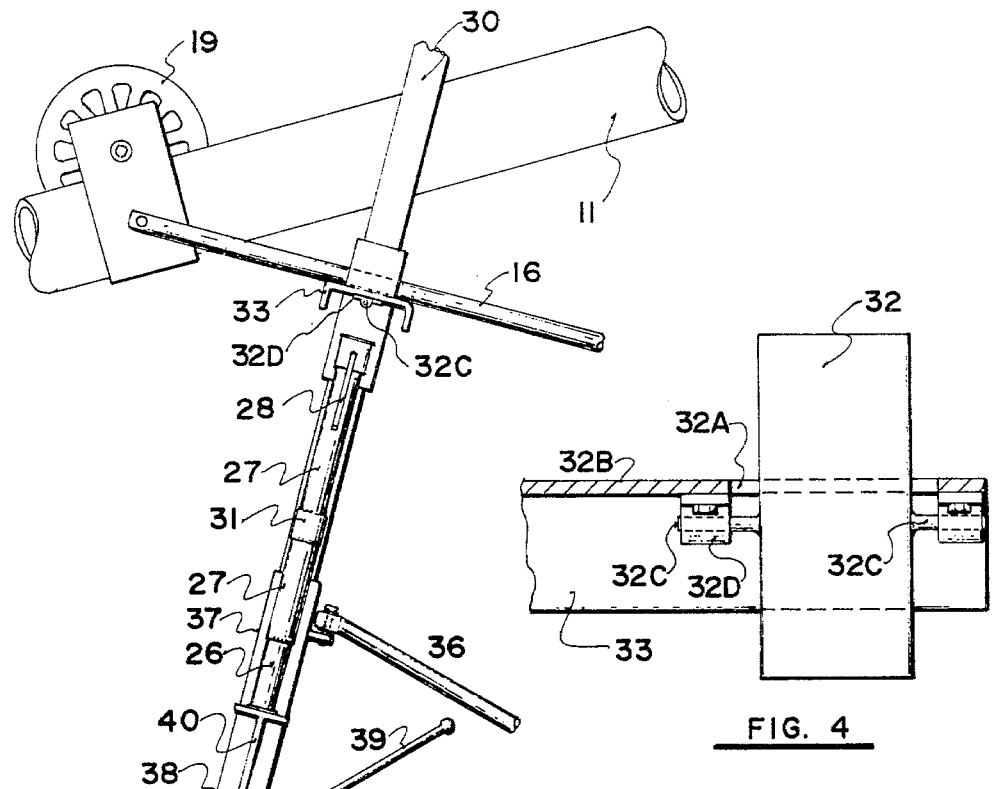

POWERED WHEEL ASSEMBLY FOR GRAIN AUGERS AND THE LIKE

BACKGROUND OF THE INVENTION

This invention relates to new and useful improvements in powered wheel assemblies for grain augers.

Relatively long grain auger assemblies are heavy and difficult to manoeuver, particularly when it is desired to lift the relatively heavy intake end of the auger and either place same within a grain bin door, for example, or alternatively, engage same with the hitch of a towing vehicle for transportation from one place to another.

SUMMARY OF THE INVENTION

The present invention overcomes these disadvantages and in accordance with the invention, there is provided an improvement to grain auger assemblies which includes an auger tube and flight therein, a pair of ground engaging wheels mounted on an axle, and adjustable front and rear braces extending between said axle and said auger tube for adjusting the inclination of said auger tube with the rear brace extending towards the intake end of said auger and the front brace extending towards the discharge end of said auger; the improvement comprising in combination a wheel assembly secured to and depending downwardly from said rear braces, said wheel assembly including a selectively ground engaging drive wheel, a source of power for said drive wheel and steering means for said drive wheel.

Another advantage of the invention is that the device may be used not only to move the grain auger assembly from one place to another, but may also facilitate the manoeuverability thereof when positioning same relative to a towing vehicle.

Another advantage of the device, in conjunction with the powered wheel assembly, is the provision of a jack assembly either mechanical or hydraulically operated, which enables the lower or intake end of the auger assembly to be raised and lowered within limits to facilitate engagement, for example, with a grain bin door or the hitch of a towing vehicle.

A still further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

FIG. 3 is a side elevation of FIG. 2.

FIG. 4 is a fragmentary enlarged, partially sectioned view of one method of mounting the wheel assembly to the auger assembly.

FIG. 5 is an end view of FIG. 4.

FIG. 6 is a view similar to FIG. 2, but showing the preferred embodiment of the invention.

FIG. 7 is an enlarged fragmentary side elevation of the connection of the wheel assembly of FIG. 6, to the auger assembly.

In the drawings like characters of reference indicate corresponding parts in the different figures.

DETAILED DESCRIPTION

Figure 1:
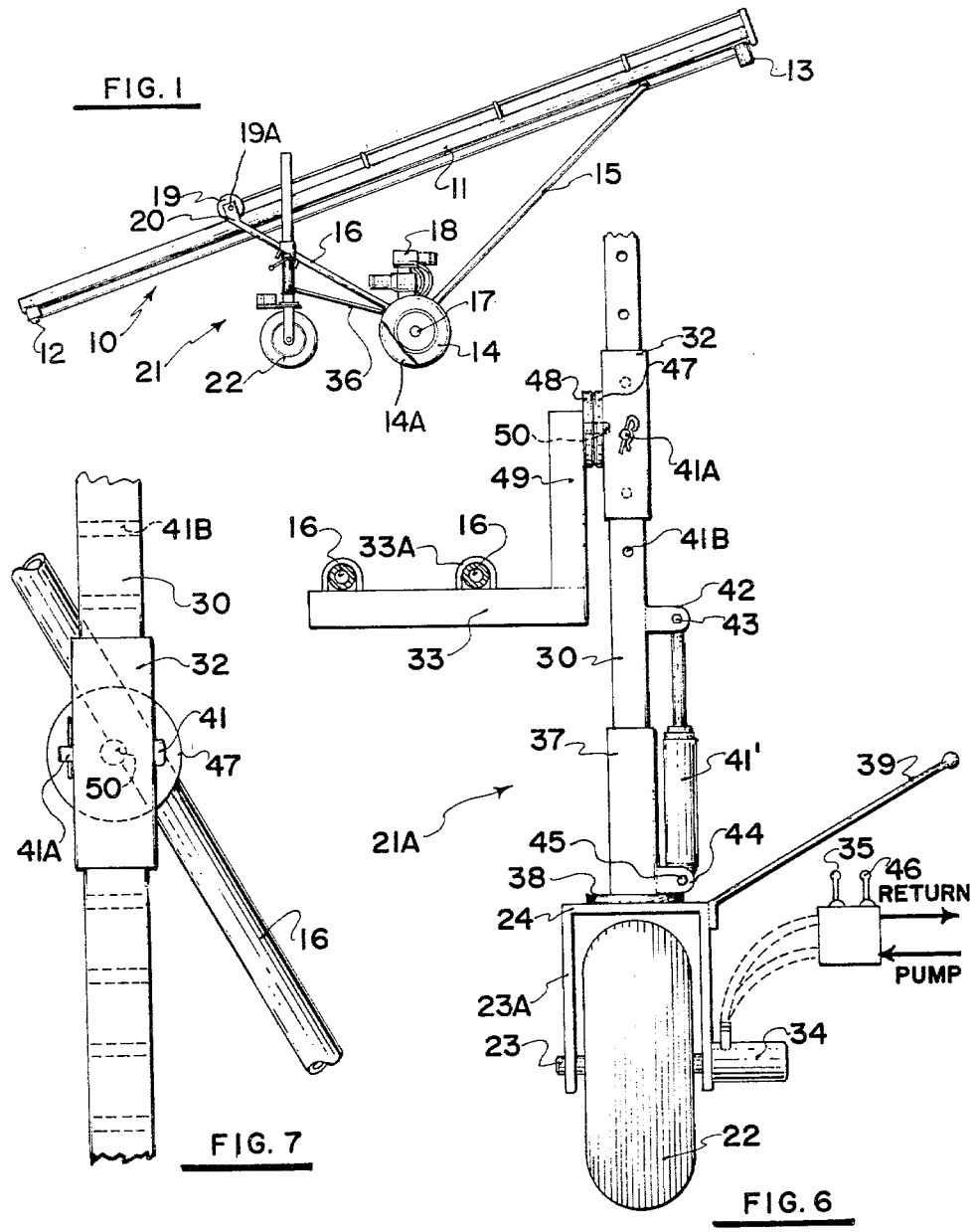
FIG. 1 is a side elevation of a grain auger assembly with the invention installed therein.
Figure 2:
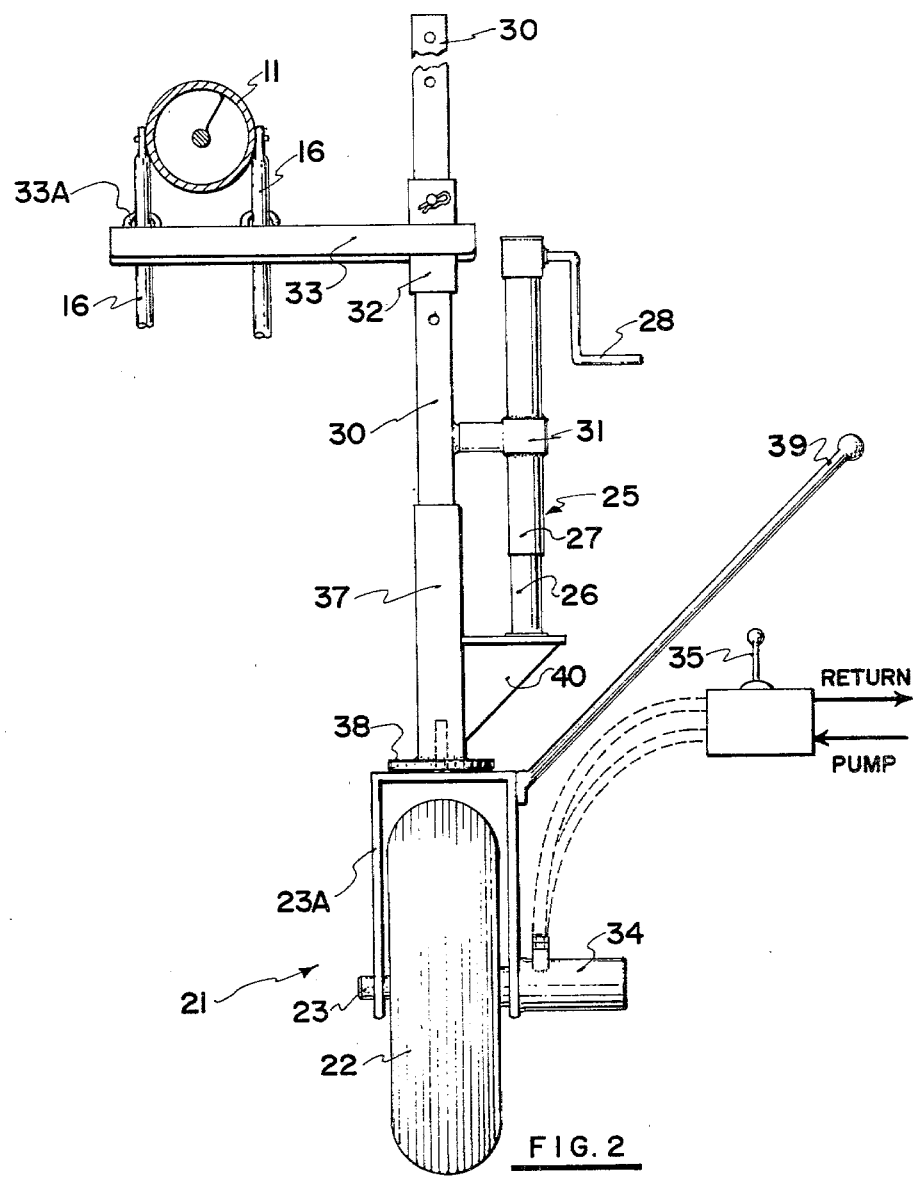
FIG. 2 is an enlarged fragmentary front elevation of one embodiment of the invention.

Proceeding therefore to describe the invention in detail, reference should first be made to FIG. 1 in which 10 illustrates generally, a conventional grain auger including an elongated auger tube 11 having an intake lower end 12 and a discharge upper end 13. The auger assembly is normally mounted on a pair of ground engaging wheels 14 and 14A with front and rear braces 15 and 16 extending between the wheel axle 17 and the auger tube. Normally, the front diagonally extending braces 15 extend outwardly and forwardly to adjacent the discharge or upper end of the auger tube and are pivotally secured thereto as at 19A. The rear braces 16 also extend from the axle 17 diagonally upwardly towards the intake end of the auger tube 12 and are normally mounted on tracks (not illustrated). Means (not illustrated) are provided to move the braces 16 along the tracks thus moving the braces 15 and 16 either towards one another or apart from one another thereby adjusting the angle of inclination of the auger tube assembly. Such structure is conventional and it is therefore not believed necessary to describe same further.

A source of power taking the form of an air cooled engine 18, is mounted adjacent the axle 17 and supplies power by means of a belt (not illustrated) to a belt pulley 19 journalled on pin 19A which drives drive shaft 20 thus rotating the auger shaft (not illustrated) within the auger tube 11.

One embodiment of the invention collectively designated 21 is shown in FIGS. 1–5 and is preferably situated rearwardly of the wheels 14 and is secured to the rear braces 16 although it may be secured to and depend from the auger tube directly if desired.

The invention shown in this embodiment, consists of a ground engageable drive wheel 22 which is preferably a rubber tired wheel mounted for rotation upon an axle 23 spanning a wheel fork assembly 23A having a top plate 24.

A jack assembly collectively designated 25 is provided and includes the jack shaft 26 reciprocal in the jack shaft tube 27. A jack handle or crank 28 engages suitable gearing within the tube 27 which in turn engages screw threads or other configurations (not illustrated) on the jack shaft 26 so that rotation of the handle retracts or extends the jack shaft 26 relative to the jack tube 27. Such construction is conventional and may take various forms.

The jack tube 27 is secured to a main vertical support shaft 30 by means of connection 31 which may be welded adjacent the lower end of shaft or tube 30 and intermediate the ends of the jack tube 27. This tube or shaft 30 extends upwardly and is socketed within an upper support tube 32 secured to a transverse member such as channel 33 which in turn is welded or otherwise secured as by U bolts 33A to the rear auger braces 16 so that it depends therefrom as clearly illustrated in FIGS. 2 and 6. Tube 32 is mounted for limited fore and aft movement in an aperture 32A within web 32B of channel 33, by means of stub shafts 32C extending from tube 32 and journalled in bearings 32D secured to the underside of the web 32B (see FIGS. 4 and 5).

The tube or shaft 30, in turn, slidably engages within a base tube 37, for vertical movement therein, and this base tube extends upwardly from a base plate 38 dowelled for partial rotation upon the upper side of the wheel fork 33A so that the wheel and fork may be steered by a handle 39 extending therefrom. The lower end of jack tube 37 is connected to plate 38 by offstanding brackets 40.

A source of power which may take the form of a hydraulic motor 34, is secured to the wheel fork 23A and is operatively connected to axle 23. This hydraulic motor is operatively connected to a source of hydraulic fluid (not illustrated) and controlled by conventional valving (not illustrated) by means of a control handle 35 mounted adjacent wheel 22 upon lower braces 36 which extend between the upper end of wheel fork 23A and the main wheel axle which give fore and aft stabilization to the wheel assembly 17.

In operation, shaft or tube 30 is connected in the desired position, within tube 32, by means of cross pin 41 extending through apertures 41A in tube 32 in any one of a plurality of apertures 41B in shaft or tube 30 to preset the relationship of the wheel 22 with the auger assembly upon which it is being mounted and the conditions under which it is being used.

The jack assembly 25 is actuated by crank 28 to extend the jack assembly thus moving the tube 37, the wheel fork 23A and the wheel 22, in contact with the ground and then raising the intake end 12 of the auger assembly clear of the ground whereupon power is supplied to the wheel 22 by means of the hydraulic motor actuated by lever 35 with the auger assembly being steered by the operator via handle 39 which moves the wheel 22 preferably through approximately 180° rotation so that the drive wheel 22 can rotate to move the auger assembly forwardly or rearwardly or to move the rear end sideways, as desired.

When the desired location is reached, the jack assembly 25 may be used to facilitate the positioning of the intake end either adjacent the hitch of a towing vehicle or adjacent the door of a grain storage bin, for example, so that the manoeuvering of the grain auger assembly manually, is reduced to the minimum. If the auger assembly is hitched to a towing vehicle, the jack assembly may then be actuated to raise the drive wheel completely clear of the ground during the towing action.

FIGS. 6 and 7 show the preferred embodiment of the invention in which the jack assembly takes the form of a hydraulic ram 41' operatively connected to the shaft or tube 30 at the upper end via offstanding lug 42 and pin 43 and by the lower end thereof to the base tube or support 37 via lug 44 and pin 45 as shown in FIG. 6. The ram is operatively connected to the source of hydraulic fluid and controlled by a further lever 46.

In this embodiment, the upper tube 32 is provided with a plate 47 engaging a plate 48 secured to an upwardly extending support 49 extending from channel 33. Pivot pin 50 connects the plates and allows limited rotational movement in a vertical plane, between the wheel assembly 21A and the auger assembly, when same is raised and lowered thus maintaining the necessary alignment of parts.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In a grain auger assembly which includes an auger tube and flight therein, a pair of ground engaging wheels mounted on an axle, and adjustable front and rear braces extending between said axle and said auger tube for adjusting the inclination of said auger tube with the rear braces extending towards the intake end of said auger and the front braces extending towards the discharge end of said auger; the improvement comprising in combination a wheel assembly secured to and depending downwardly from said rear braces, said wheel assembly including a selectively ground engaging drive wheel, a source of power for said drive wheel and steering means for said drive wheel, means mounting said wheel assembly to said rear braces, said means including a wheel fork assembly for said wheel, said wheel being journalled for rotation within said wheel fork, a plate, a lower support tube extending upwardly from said plate, said plate being secured to the upper end of said wheel fork whereby said wheel fork and said plate include means mounting same for partial rotation relative to said lower support tube, a main shaft slideably engaging said lower support tube for reciprocal motion therein, means operatively connecting said main shaft to said auger assembly, means to raise and lower said drive wheel relative to said rear braces, said means including a jack assembly operatively connected between said lower support tube and said main shaft for moving said lower support tube and said wheel fork assembly and said wheel relative to said main shaft.

2. The improvement according to claim 1 in which said means operatively connecting said main shaft to said auger assembly includes a cross member secured to said front braces, an upper support tube, said main shaft being adjustably secured within said upper support tube, and means mounting said upper support tube for limited pivotal movement to said cross member.

3. The improvement according to claim 2 in which said last mentioned means includes bearings on said cross member, stub axles secured to and extending from said upper support tube, said stub axles being supported within said bearings.

4. The improvement according to claim 2 in which said last mentioned means includes an upwardly extending support secured to said cross member, a fixed bearing plate secured to said support, a fixed bearing plate secured to said upper support tube, said bearing plates engaging one another in interfacial relationship and a pivot pin extending between said bearing plates supporting said second mentioned bearing plate for pivotal movement relative to said first mentioned bearing plate, in a vertical plane.

5. The improvement according to claims 1, 2 or 3 in which said jack assembly comprises a mechanical jack.

6. The improvement according to claim 4 in which said jack assembly comprises a mechanical jack.

7. The improvement according to claims 1, 2 or 3 in which said jack assembly comprises a hydraulic ram.

8. The improvement according to claim 4 in which said jack assembly comprises a hydraulic ram.

* * * * *